Patented Mar. 26, 1935

1,996,007

UNITED STATES PATENT OFFICE 1,996,007

PREPARATION OF 2-CHLORO-6-NITROBENZALDOXIME

Emeric Havas, South Milwaukee, Wis., assignor to E. I. du Pont de Nemours & Company, Wilmington, Del., a corporation of Delaware No Drawing. Application July 27, 1933, Serial No. 682,428

3 Claims. (Cl. 260—127)

This invention relates to the preparation of 2-chloro-6-nitrobenzaldoxime which I have found to be a new and valuable intermediate for the preparation of certain dyestuffs.

In my copending application Serial No. 682,427 filed of even date herewith, I have described the preparation of a new mercury compound of 2-chloro-6-nitrotoluene which is produced by the action of nitrous acid on 2-chloro-6-nitrobenzaldimercurioxide, the preparation of which latter compound is described in my copending application Serial No. 682,426. According to the preferred method for the preparation of 2-chloro-6-nitrobenzaldimercurioxide as outlined in the example of application Ser. No. 682,426, 441 parts of pure freshly precipitated yellow mercuric oxide are stirred with 5000 parts of water and 88 parts of flaked caustic soda and heated to boil under a reflux condenser. 171.5 parts of 2-chloro-6-nitrotoluene are added in small amounts over a period of twelve hours while the temperature is maintained at about 95 to 99° C. with continuous agitation. After the addition is completed the mass is heated at 95 to 99° C. for twelve hours or until all of the chloro-nitrotoluene has been reacted. The mass is then cooled, filtered and the resulting solid dried at a low temperature. The product obtained when dry is an orange yellow powder, stable at ordinary temperatures. On heating it is decomposed. The product is believed to be 2-chloro-6-nitrobenzaldimercurioxide of the following probable formula:

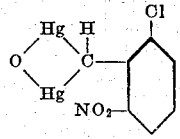

According to the preferred method for the conversion of this compound to the corresponding nitrite, as found in the specific example of U. S. application Ser. No. 682,427, 586.5 parts of 2-chloro-6-nitrobenzaldimercurioxide are stirred at 22°–25° C. with about 4000 parts of water, 142 parts of technical sodium nitrite are added and 1000 parts of 10% sulfuric acid are dropped into the mixture until there is a slight acid reaction to Congo paper. The mass is then filtered, washed with water and dried at a low temperature. The product is a light yellow crystalline powder which starts to decompose at 50°–60° C. and has, very probably, the following formula:

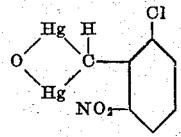

According to the present invention, the nitrite compound of 2-chloro-6-nitrobenzaldimercurioxide as obtained above is treated with hydrochloric acid, whereby it is split substantially quantitatively into 2-chloro-6-nitrobenzaldoxime and mercuric chloride. The mercuric chloride is obtained in such a form that it is readily converted to mercuric oxide which may be used in the preparation of the starting material.

While Reissert in Berichte volume 40, pages 4209–4226, has described the preparation of 2-nitrobenzaldoxime from o-nitrotoluene by converting it first to the mercuric oxide compound, it was not to be expected that 2-chloro-6-nitrotoluene would react with mercuric oxide to give a product that could be converted into 2-chloro-6-nitrobenzaldoxime, for as disclosed by Reissert even p-nitrotoluene and 2-4 dinitrotoluene would not react to give compounds from which the aldoximes could be produced.

In the decomposition of the nitrite of the o-nitrobenzaldimercurioxide of Reissert a mixture of o-nitrobenzaldehyde and o-nitrobenzaldoxime is obtained which is quite difficult to separate, while in the decomposition of the nitrite of 2-chloro-6-nitro-benzaldimercurioxide according to my procedure very high yields of a substantially pure 2-chloro-6-nitrobenzaldoxime are obtained. The aldoxime which I have now produced is much more stable than the aldoxime produced by Reissert.

To more fully illustrate my invention the following example is given in which the parts used are by weight:

Example

To 225 parts of 16.3° Bé. hydrochloric acid which is cooled to about 10° C. are added alternately in small amounts, 481 parts of the nitrite compound of 2-chloro-6-nitrobenzaldimercurioxide (above described) and 750 parts of concentrated hydrochloric acid, 22° Bé., the temperature being maintained at from 15–25° C. After the strong yellow color of the nitrite compound has disappeared the cream colored crystals are filtered, washed with water and dried. The product thus prepared has a melting point of 152–154° C. and upon recrystallization from toluene has a melting point of 156–157° C.

It is insoluble in cold water, soluble in hot water and in most of the organic solvents. It is also soluble with a yellow color in dilute caustic solution from which it can be precipitated with acid unchanged. The product has the following probable formula:

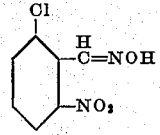

Various concentrations of hydrochloric acid may be used so long as the concentration of the acid in the reaction is maintained at about 25%. If the dinitrite compound is used in the wet form, dry HCl may be added. Other acids such as sulfuric, hydrobromic, etc. may be used. The halogen acids are preferred over sulfuric acid since they form mercury salts which are soluble in the solution and are easily separated from the aldoxime. The temperature during the decomposition should be maintained at from 10 to 30° C.

While I have described a particular process by which 2-chloro-6-nitrobenzaldoxime may be prepared it will be obvious to those skilled in the art that various changes may be made without departing from the spirit of my invention and the scope of the following claims.

I claim:

1. As a new product, 2-chloro-6-nitro-benzaldoxime.

2. The process for preparing 2-chloro-6-nitrobenzaldoxime which comprises treating the nitrite compound of 2-chloro-6-nitrobenzaldimercurioxide with a strong non-oxidizing mineral acid.

3. The process for preparing 2-chloro-6-nitrobenzaldoxime which comprises treating the nitrite compound of 2-chloro-6-nitrobenzaldimercurioxide with hydrochloric acid of approximately 25% at a temperature of 15°–25° C.

EMERIC HAVAS.